United States Patent
Pöhnlein et al.

(10) Patent No.: US 11,371,585 B2
(45) Date of Patent: Jun. 28, 2022

(54) OIL PUMP DRIVE DEVICE

(71) Applicant: ZF Friedrichshafen AG, Friedrichshafen (DE)

(72) Inventors: Florian Pöhnlein, Weildorf (DE); Ingo Lippenberger, Weingarten (DE); Ralf Schmieder, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 312 days.

(21) Appl. No.: 16/635,847

(22) PCT Filed: Jul. 2, 2018

(86) PCT No.: PCT/EP2018/067799
§ 371 (c)(1),
(2) Date: Jan. 31, 2020

(87) PCT Pub. No.: WO2019/025100
PCT Pub. Date: Feb. 7, 2019

(65) Prior Publication Data
US 2020/0224748 A1 Jul. 16, 2020

(30) Foreign Application Priority Data
Aug. 2, 2017 (DE) .................. 10 2017 213 412.7

(51) Int. Cl.
*F16H 1/28* (2006.01)
*H02K 11/21* (2016.01)
(Continued)

(52) U.S. Cl.
CPC ............... *F16H 1/28* (2013.01); *F04D 13/06* (2013.01); *F04D 29/044* (2013.01);
(Continued)

(58) Field of Classification Search
None
See application file for complete search history.

(56) References Cited

U.S. PATENT DOCUMENTS 6,644,939 B2 * 11/2003 Vukovich ........... F04C 15/0061
417/374
6,802,796 B2 * 10/2004 Asa ......................... B60K 6/48
477/3
(Continued)

FOREIGN PATENT DOCUMENTS

| CN | 105099045 A | 11/2015 |
| DE | 10329215 A1 | 1/2005 |

(Continued)

OTHER PUBLICATIONS

International Search Report (English Translation) PCT/EP2018/067799, dated Oct. 4, 2018. (2 pages).
(Continued)

*Primary Examiner* — Dirk Wright
(74) *Attorney, Agent, or Firm* — Dority & Manning, P.A.

(57) ABSTRACT

An oil pump drive device (1) may include a housing (G), an oil pump drive shaft (AN), an electric motor, and a planetary gear set (RS). The planetary gear set (RS) may be supported by the housing (G) and have a first element (E1) connected to a rotor (R) of the electric motor, a second element (E2) connected to the oil pump drive shaft (AN), and a third element (E3) drivable by a drive source located outside the oil pump drive device (1). A first bearing (L1) may be supported on the housing (G) and may support at least one of the elements (E1, E2, E3) of the planetary gear set (RS) in a radial direction. The stator (S) of the electric motor is at least partially surrounded by a plastic mass (K), where the stator (S) is attached to the housing (G) via the plastic mass (K).

17 Claims, 7 Drawing Sheets

(51) Int. Cl.
- *H02K 11/30* (2016.01)
- *F04D 13/06* (2006.01)
- *F04D 29/044* (2006.01)
- *F16H 57/021* (2012.01)
- *F16H 57/031* (2012.01)
- *F16H 61/00* (2006.01)
- *H02K 5/173* (2006.01)
- *H02K 7/08* (2006.01)
- *H02K 7/116* (2006.01)
- *F16H 57/02* (2012.01)

(52) U.S. Cl.
CPC ......... *F16H 57/021* (2013.01); *F16H 57/031* (2013.01); *F16H 61/0031* (2013.01); *H02K 5/1732* (2013.01); *H02K 7/083* (2013.01); *H02K 7/116* (2013.01); *H02K 11/21* (2016.01); *H02K 11/30* (2016.01); *F16H 2057/02034* (2013.01); *F16H 2057/02043* (2013.01)

(56) References Cited

U.S. PATENT DOCUMENTS

| | | | |
|---|---|---|---|
| 7,250,017 | B2 * | 7/2007 | Asa .......................... H02K 7/11 475/8 |
| 8,876,644 | B2 | 11/2014 | Riegert et al. |
| 2003/0035742 | A1 | 2/2003 | Vukovich et al. |
| 2012/0269653 | A1 | 10/2012 | Lutoslawski et al. |

FOREIGN PATENT DOCUMENTS

| | | |
|---|---|---|
| DE | 102011088060 A1 | 6/2013 |
| DE | 102013212930 A1 | 1/2015 |
| DE | 102014200328 A1 | 7/2015 |
| WO | WO 2010/142042 | 12/2010 |
| WO | WO 2013/007247 | 1/2013 |
| WO | WO 2017/055579 | 4/2017 |

OTHER PUBLICATIONS

German Search Report DE102017213412.7, dated Mar. 19, 2018. (12 pages).

* cited by examiner

OIL PUMP DRIVE DEVICE

CROSS-REFERENCE TO RELATED APPLICATION

The present application is related and has right of priority to Patent Cooperation Treaty (PCT) Application No. PCT/EP2018/067799 filed on Jul. 2, 2018, the entirety of which is incorporated by reference for all purposes.

FIELD OF THE INVENTION

The invention relates generally to an oil pump drive device having an oil pump drive shaft, an electric motor, and a planetary gear set. The invention further relates generally to a motor vehicle transmission having such an oil pump drive device.

BACKGROUND

Patent application WO 2010/142042 A1 describes a pump system for a vehicle, wherein the pump system has a housing, an electric machine, a control unit, a planetary gear set, and a pump. The housing encloses the electric machine, the pump, and the control unit.

One problem addressed by the invention is that of further developing the pump system known from the prior art.

SUMMARY OF THE INVENTION

An oil pump drive device is provided, which includes an oil pump drive shaft, an electric motor, and a planetary gear set. The planetary gear set has a first element, a second element, and a third element. The first element of the planetary gear set is connected to a rotor of the electric motor. The second element of the planetary gear set is connected to the oil pump drive shaft. The third element of the planetary gear set is drivable by a drive source, which is arranged outside the oil pump drive device. Due to such a configuration, the oil pump drive shaft is drivable by the electric motor or by the drive source.

A housing, on which at least one first bearing is supported, is associated with the planetary gear set. At least one element of the planetary gear set, for example, a sun gear of the planetary gear set, is supported in the radial direction by the first bearing.

According to the invention, a stator of the electric motor is at least partially surrounded by a plastic mass, wherein the stator is attached to the housing of the planetary gear set via the plastic mass. The stator therefore does not have a separate housing, whereby the outer diameter of the oil pump drive device is kept particularly small. Thus, the electric motor can therefore be larger compared to an approach with separate housings for the stator and the planetary gear set. As a result, the power available for driving the oil pump is increasable.

Preferably, the stator is only partially surrounded by the plastic mass, so that at least one of a laminated core or a winding overhang is partially exposed. As a result, good cooling of the stator is ensured, for example, using oil cooling. In addition, the outer dimensions are kept small. Alternatively, the stator is completely surrounded by the plastic mass except for the interconnection ends or terminals.

Preferably, the rotor and the stator protrude from the housing. In other words, the rotor as well as the stator are not enclosed by the housing, but rather protrude, starting from one end of the housing. As a result, a geometrically slim configuration is ensured. In this case, "rotor" and "stator" are understood to mean, in particular, the electromagnetically active elements, i.e., for example, the laminated core and the winding overhang of the stator, or a laminated core of the rotor having, if necessary, magnets attached thereto. The plastic mass enclosing the stator can protrude, in sections, into the housing.

According to one preferred embodiment, the rotor of the electric motor is rotatably mounted by the first bearing and a second bearing. For this purpose, the second bearing is supported on the plastic mass. The support takes place, in this case, preferably via a bush bearing introduced into the plastic mass. The first bearing or the second bearing is preferably, in this embodiment, a freewheel unit.

According to one preferred embodiment, the oil pump drive device includes a cover plate. The cover plate has an interface to a phase circuit of the stator, i.e., to the interconnection ends or terminals of the stator. Additionally, a speed sensor, which is configured to detect a rotational speed of the rotor, is attachable to the cover plate. The cover plate therefore acts as an electrical interface of the stator and as a carrier of the speed sensor.

Preferably, the stator is arranged between the housing and the cover plate. According to one preferred embodiment, the cover plate, together with the plastic mass, is attached to the housing by multiple bolts, wherein the bolts are distributed along a circumference of the stator. If the stator is arranged between the housing and the cover plate, the stator is preferably tensioned between the housing and the cover plate by the bolts. For example, three bolts are usable for attachment.

Preferably, the oil pump drive device includes an electronic control unit for controlling the electric motor. The electronic control unit is attached to at least one of the housing or to the plastic mass. The control unit can include a further interface, the further interface cooperating or coupling with the interface arranged on the cover plate, for example, by a plug connection. The two interfaces may preferably transmit a signal of the speed sensor to the electrical control unit.

Preferably, the first element of the planetary gear set is a sun gear, the second element is a planet carrier, and the third element is a ring gear. As such, the third element is particularly easily accessible to the drive source, for example, via a spur gear drive or via a sprocket. Due to the first element being the sun gear of the planetary gear set, the load on the electric motor is also lower than if the first element was the planet carrier.

The oil pump drive device can be an integral part of a motor vehicle transmission. For example, the oil pump drive device is attachable to a hydraulic control unit.

The hydraulic control unit has multiple hydraulic valves by which hydraulic actuators of the transmission are controlled by an open-loop system. An oil pump connected to the oil pump drive shaft is arrangeable within the hydraulic control unit, in particular within a housing of the hydraulic control unit.

BRIEF DESCRIPTION OF THE DRAWINGS

One exemplary embodiment of the invention is described in detail in the following with reference to the attached figures. In the figures, the following is shown.

DETAILED DESCRIPTION

Figure 1:
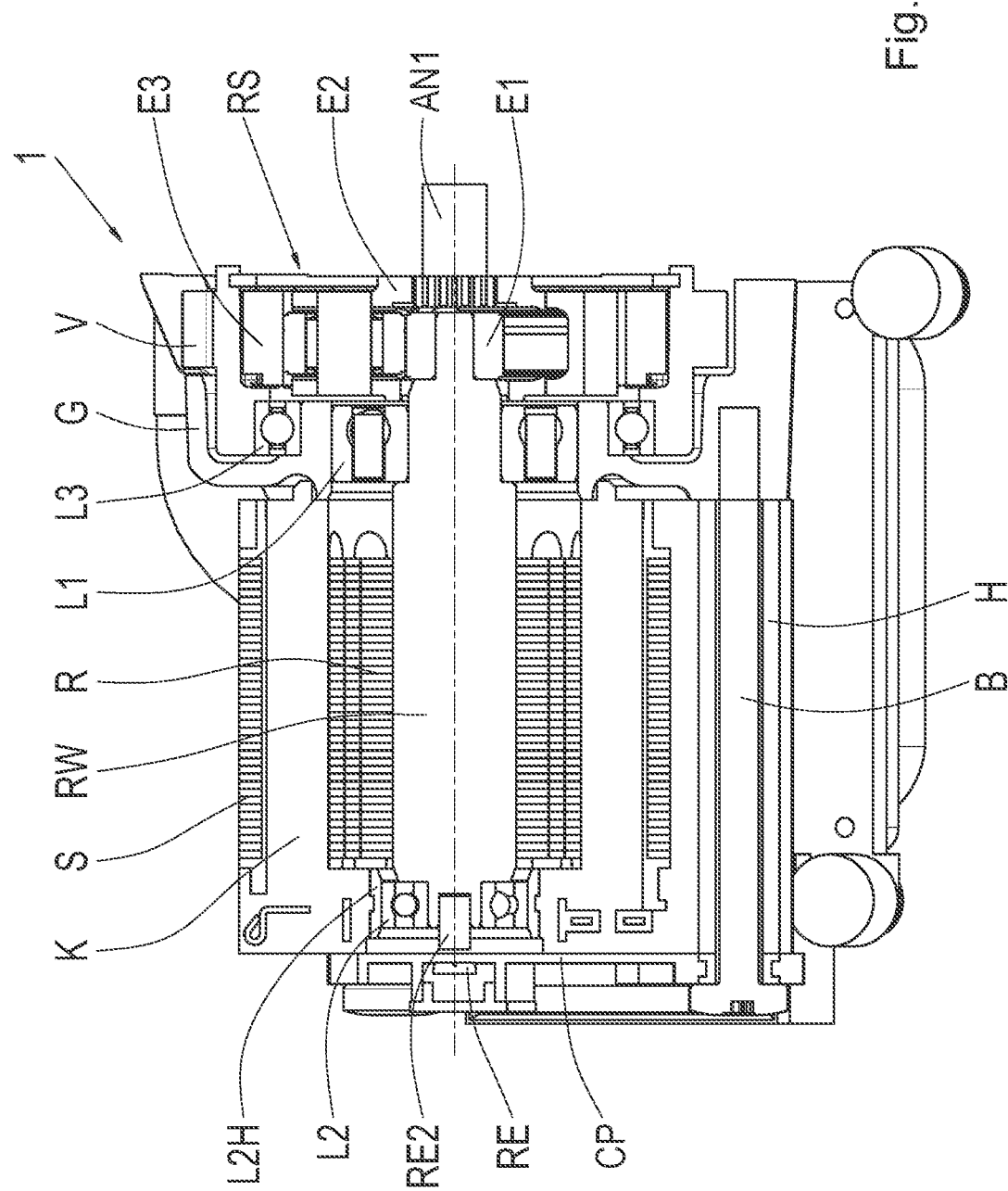
FIG. 1 shows a section view through an oil pump drive device according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a section view of an oil pump drive device 1 according to the invention. The oil pump drive device 1 includes an oil pump drive shaft AN1, a planetary gear set RS, a housing G, and an electric motor. The planetary gear set RS has a first element E1, a second element E2, and a third element E3. The first element E1 of the planetary gear set RS is a sun gear. The second element E2 of the planetary gear set RS is a planet carrier. The third element E3 of the planetary gear set RS is a ring gear. Multiple planet gears, which intermesh with the sun gear and the ring gear, are rotatably mounted on the planet carrier.

The first element E1 of the planetary gear set RS, i.e., the sun gear, is connected to a rotor R of the electric motor. The second element E2 of the planetary gear set RS, i.e., the planet carrier, is connected to the oil pump drive shaft AN1. The third element E3 of the planetary gear set RS, i.e., the ring gear, is drivable by a drive source, which is located outside the oil pump drive device 1. For this purpose, the oil pump drive device 1 includes an external gearing V, which is connected to the third element E3 of the planetary gear set RS, i.e., to the ring gear. Using the external gearing V, the third element E3 is drivable from the outside, for example, by a gearwheel or a chain.

The housing G supports the planetary gear set RS. A first bearing L1 is supported on the housing G for rotatably mounting the first element E1 of the planetary gear set RS, i.e., the sun gear. In particular, the mounting of the sun gear takes place via a rotor shaft RW, the rotor shaft RW being rotationally fixed to the rotor R of the electric motor and to the sun gear, where the sun gear and the rotor shaft RW are supported in the radial direction by the first bearing L1. Moreover, a further bearing L3 is supported on the housing G for mounting the ring gear of the planetary gear set RS. The housing G at least partially encloses the planetary gear set RS.

A stator S of the electric motor is surrounded, in sections, by a plastic mass K. In the embodiment shown in FIG. 1, a laminated core of the stator S is partially exposed, i.e., is not completely surrounded by the plastic mass K. The stator S is fixed to the plastic mass K and is attached to the housing G via the plastic mass K. For this purpose, the oil pump drive device 1 uses multiple bolts B, the free end of each bolt B having a respective thread. The thread cooperates or engages with a thread formed in the housing G. Sleeves H are arranged in the plastic mass K, into each of which one of the bolts B has been guided. The rotor R and the stator S therefore do not have a separate housing. Instead, they protrude from the housing G.

The rotor R is rotatably supported by the first bearing L1 and a second bearing L2. The second bearing L2 is supported in the plastic mass K by a bearing sleeve L2H. A transmitter RE2, which is rotationally fixed to the rotor shaft RW, is arranged radially within the second bearing L2. The transmitter RE2 cooperates or interfaces with a speed sensor RE, the speed sensor RE being configured for detecting a rotational speed of the rotor R. The speed sensor RE is attached to a cover plate CP. The cover plate CP, together with the plastic mass K, is attached to the housing G. In particular, the plastic mass K is tensioned between the housing G and the cover plate CP via the bolts B.

Figure 2:
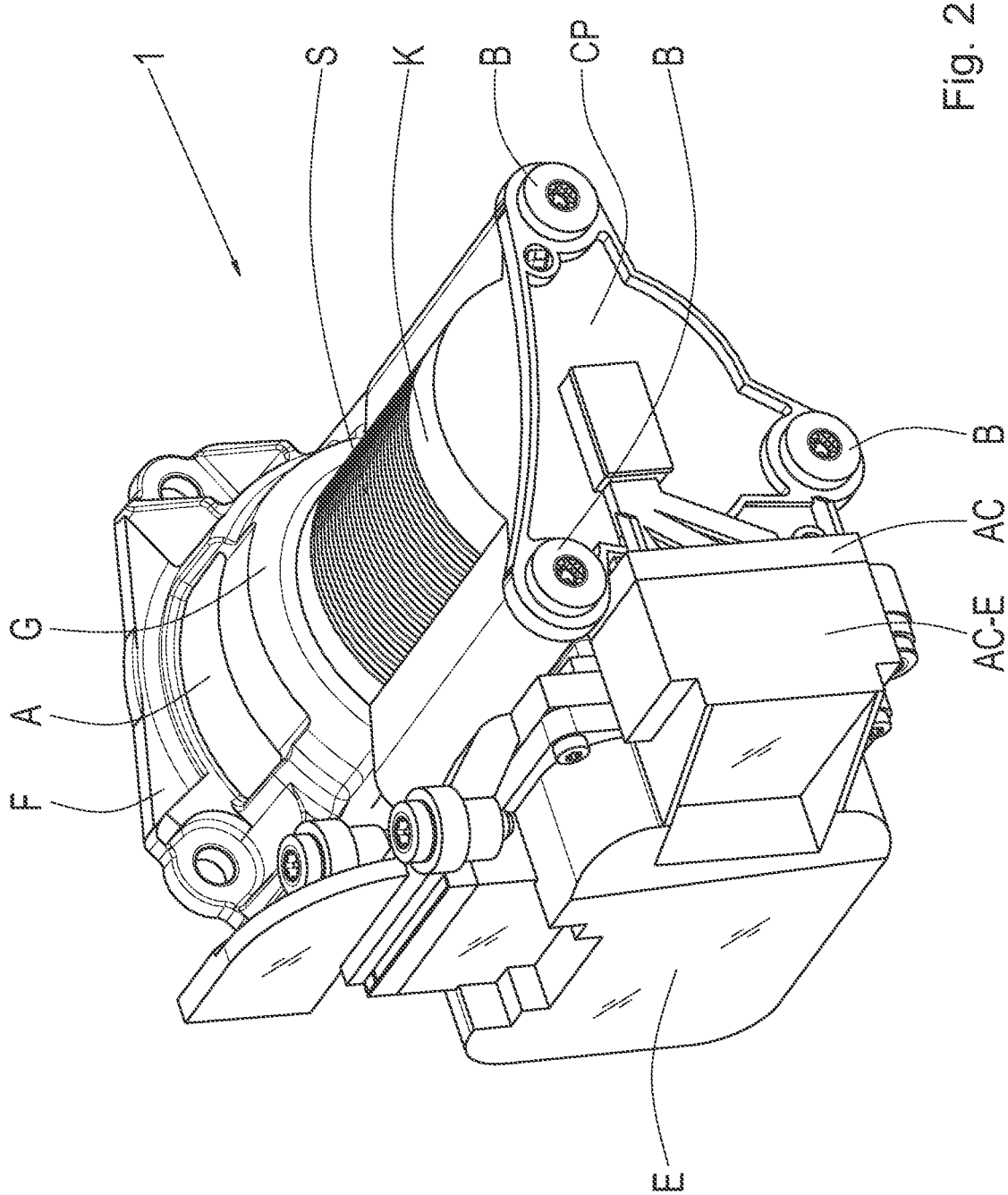
FIG. 2 shows an isometric view of the oil pump drive device according to the invention.

FIG. 2 shows an isometric view of the oil pump drive device 1 according to the invention, in which a flange section F (not represented in FIG. 1) of the housing G is shown. With the flange section F, the oil pump drive device 1 is attachable, for example, via a bolted connection, to another component of a motor vehicle, for example.

An interface AC is arranged on the cover plate CP. The phase interface AC acts as an electrical interface to a phase circuit of the stator S. The oil pump drive device 1 includes a control unit E, which is attached to the housing G. Alternatively, the control unit E could be attached to the plastic mass K. The control unit E is configured for the open-loop control of the electric motor and includes a further interface AC-E, which cooperates or couples with the interface AC, in this case, for example, using a plug connection. Via the plug connection, a signal of the speed sensor RE is transmitted to the control unit E.

Figure 3:
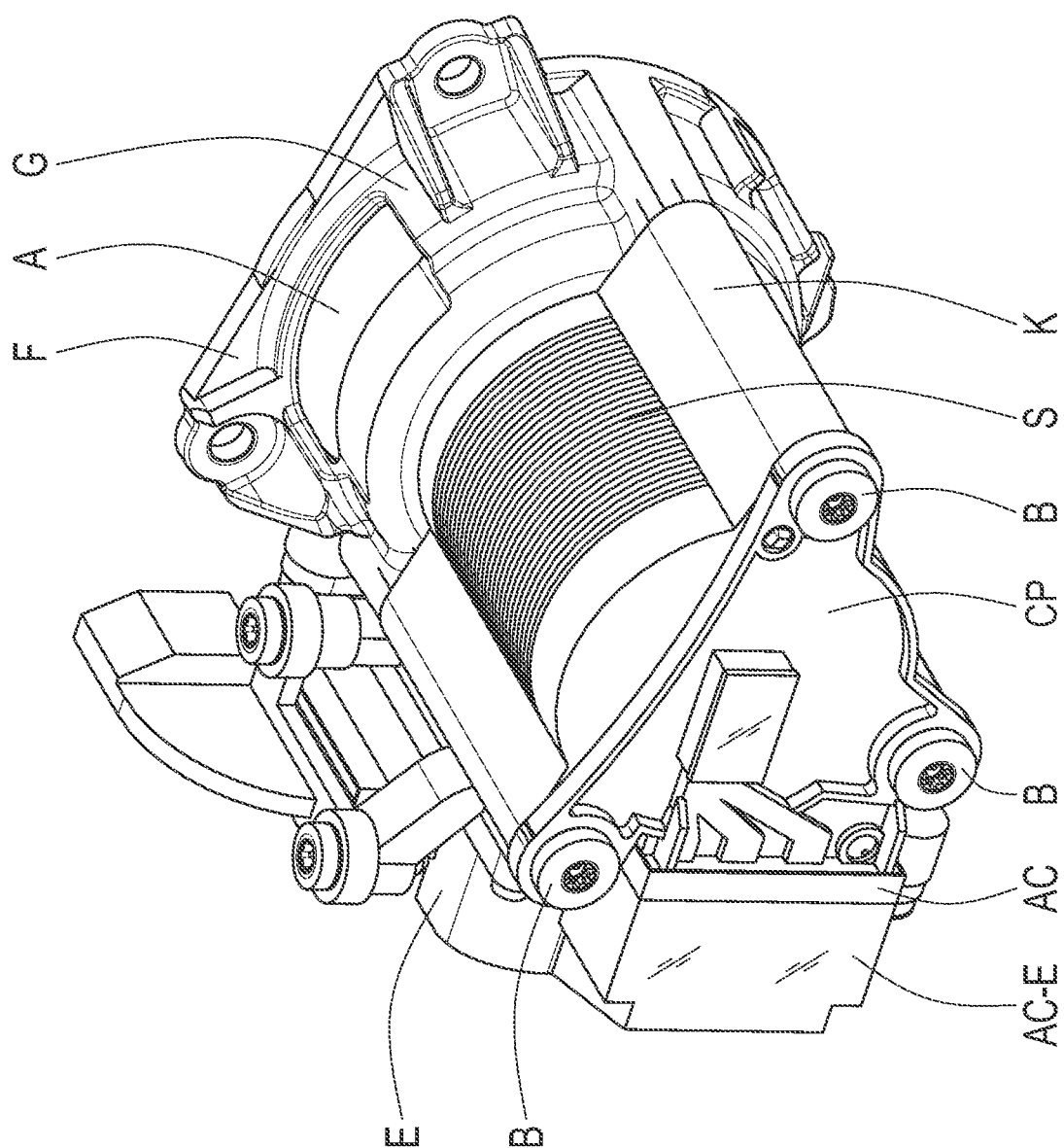
FIG. 3 shows another isometric view of the oil pump drive device according to the invention.

FIG. 3 shows a further isometric view of the oil pump drive device 1 according to the invention. As shown in FIG. 3, the housing G has a cutout A. The cutout A is utilized for the accessibility of the external gearing V (not shown in FIGS. 2 and 3). For example, a sprocket for driving the third element E3 of the planetary gear set RS can extend through the cutout A. Alternatively, the external gearing V can be made accessible to a gearwheel through the cutout A.

It is particularly clear from FIG. 3 that the plastic mass K partially surrounding the stator S protrudes from the housing G. As a result, the oil pump drive device 1 has particularly small outer dimensions.

Figure 4:
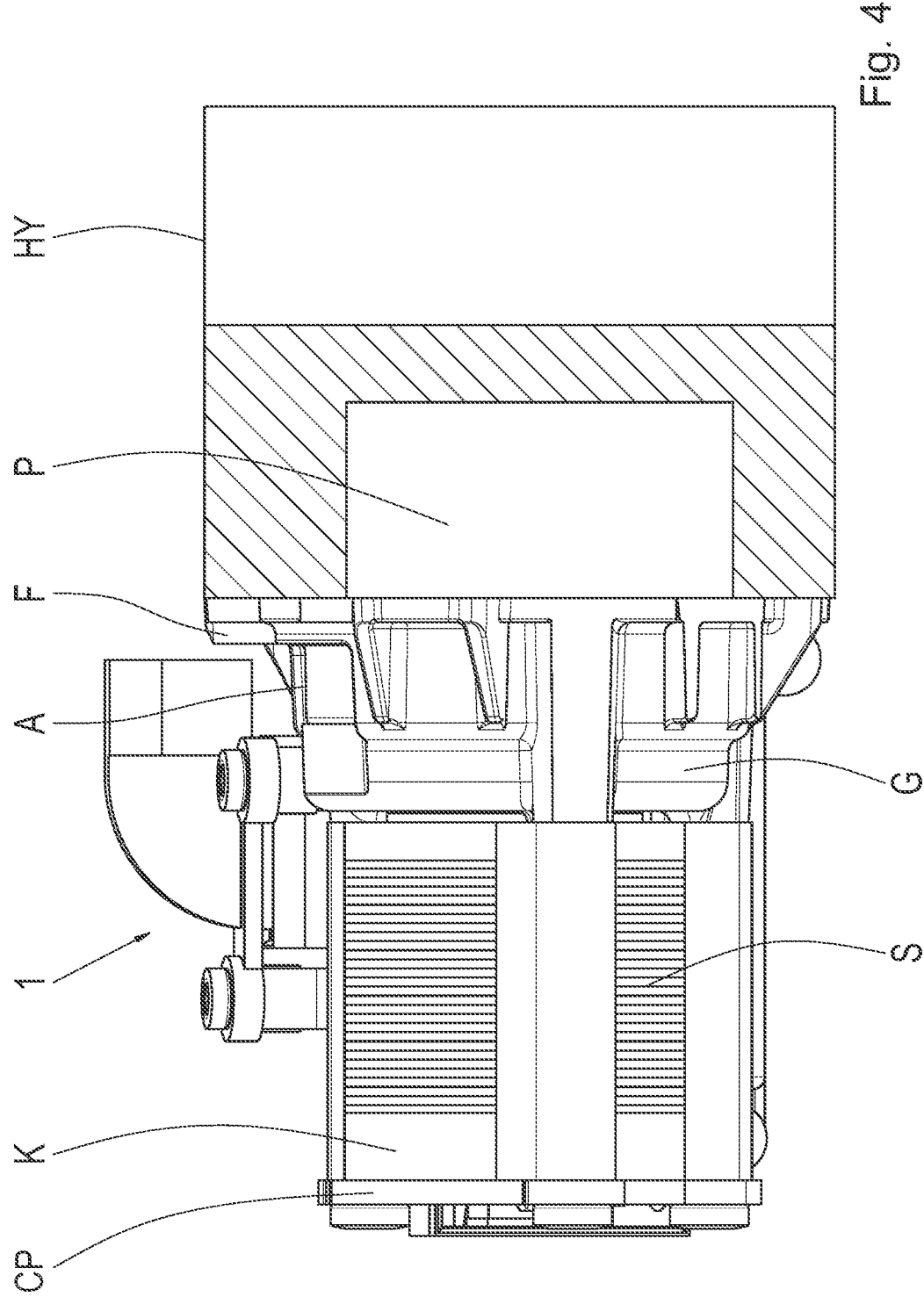
FIG. 4 shows a side view of the oil pump drive device according to the invention together with a hydraulic control unit of a transmission.

FIG. 4 shows a side view of the oil pump drive device 1 according to the invention together with a hydraulic control unit HY. The oil pump drive device 1 is attached via its flange section F to the hydraulic control unit HY, for example, via a bolted connection. The oil pump drive shaft AN1 (not represented in FIG. 4) is connected to an oil pump P, which is arranged within the hydraulic control unit HY. In this way, a particularly compact configuration of the assembly made up of the oil pump drive device 1 and the hydraulic control unit HY is formable.

Figure 5:
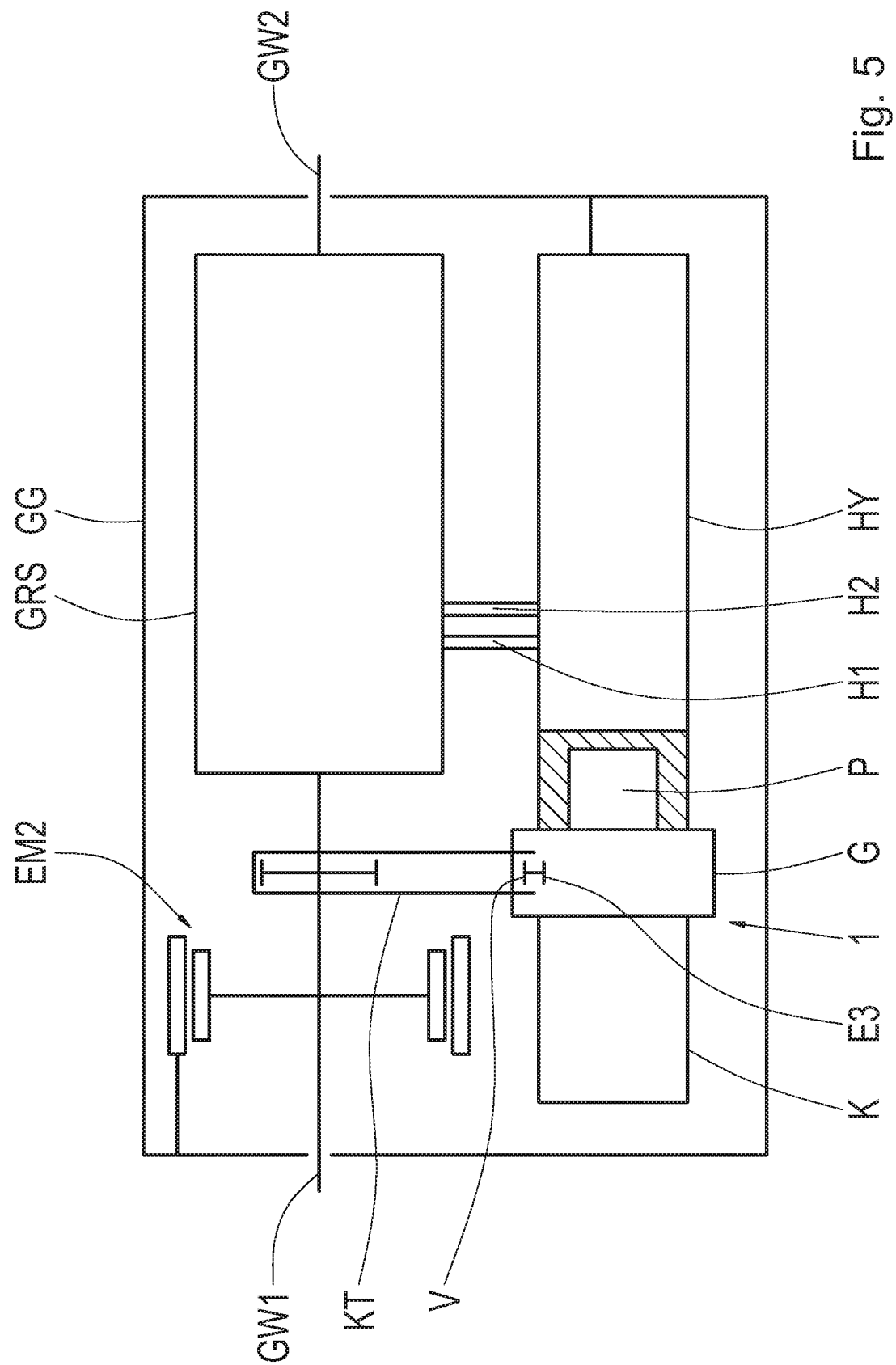
FIG. 5 shows a schematic view of a motor vehicle transmission having the oil pump drive device according to the invention.

FIG. 5 shows a schematic view of a transmission for a motor vehicle. The transmission has an input shaft GW1, an output shaft GW2, and a transmission gear set GRS in a housing GG. The transmission gear set GRS is configured for implementing different transmission ratios between the input shaft GW1 and the output shaft GW2, in that shift elements (not shown) are hydraulically actuated. The transmission has the oil pump drive device 1 according to the invention, which is connected to the hydraulic control unit HY, for supplying pressure to the shift elements. The hydraulic control unit HY has multiple valves (not shown). The hydraulic control unit HY is connected to the transmission gear set GRS, or to the shift elements located therein, via the hydraulic lines H1, H2. More than two hydraulic lines are usable. The oil pump P is arranged within the hydraulic control unit HY. Oil is conveyed to the valves of the hydraulic control unit HY via the drive of the oil pump P.

The oil pump P is drivable by the electric motor of the oil pump drive device 1 or by the input shaft GW1. For this purpose, the input shaft GW1 is connected to the third element E3 of the planetary gear set RS via a sprocket KT and via the external gearing V. The drive of the input shaft GW1 takes place either with a transmission-external internal combustion engine connected to the input shaft GW1 or, optionally, with an electric machine EM2, whose rotor is connected to the input shaft GW1. The electric machine EM2 is arranged within the transmission housing GG, by way of example. Alternatively, the electric machine EM2 is arrangeable outside the transmission housing GG.

If the drive of the oil pump P takes place with the input shaft GW1, a supporting torque is to be applied at the planetary gear set RS, so that power is transmittable via the planetary gear set RS. The supporting torque is made available, for example, via a freewheel unit or with the electric motor of the oil pump drive device 1.

Figure 6:
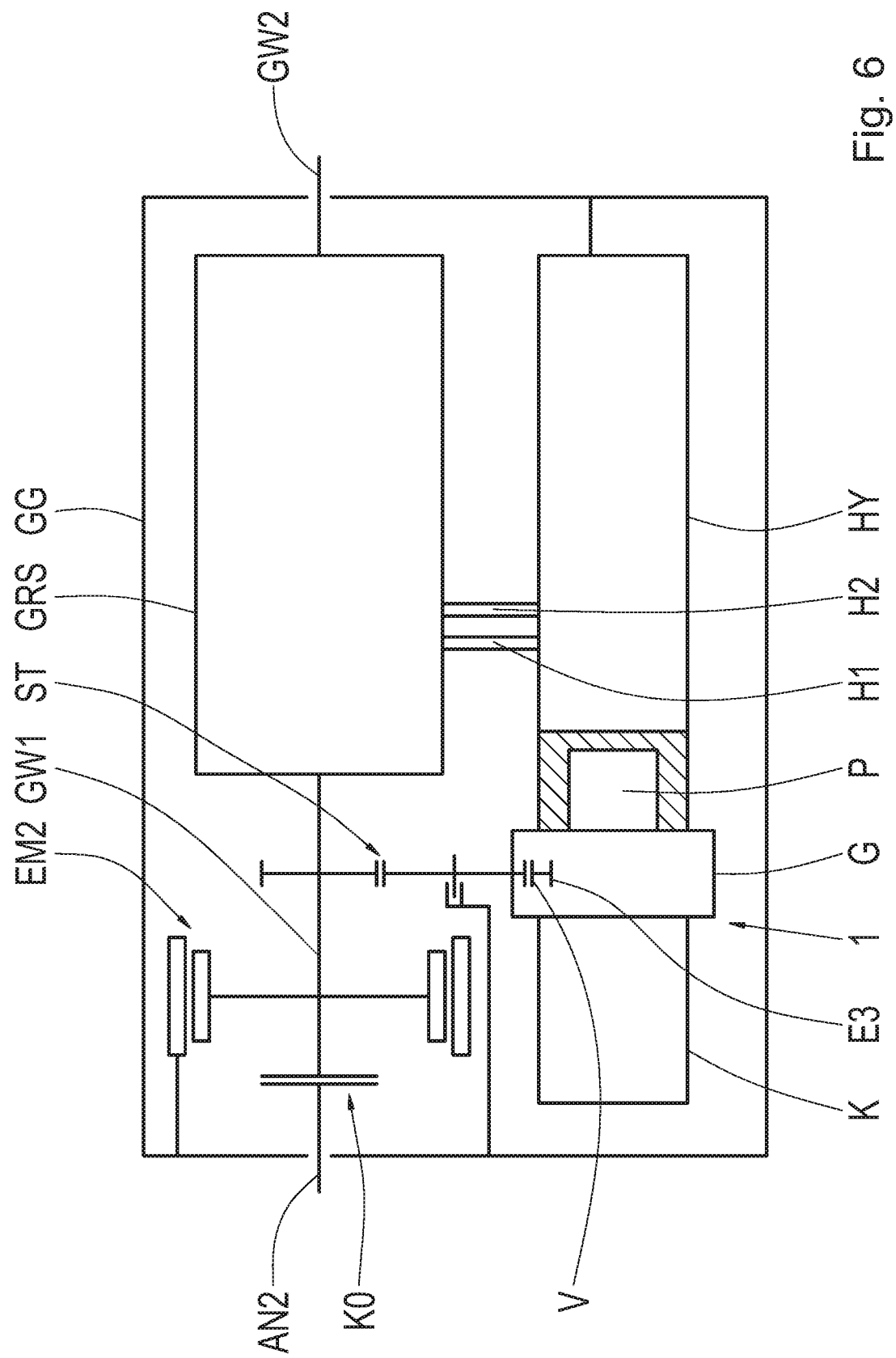
FIG. 6 shows another schematic view of a motor vehicle transmission having the oil pump drive device according to the invention.

FIG. 6 shows another schematic view of a transmission for a motor vehicle, which essentially corresponds to the transmission represented in FIG. 5, except that the transmission has a separating clutch K0 in this case. The input shaft GW1 is disconnectable from engagement with a connection shaft AN2 of the transmission via the separating clutch K0. Therefore, the electric machine EM2 can drive the input shaft GW1 without entraining an internal combustion engine connected to the connection shaft AN2.

The transmission according to FIG. 6 also differs from the transmission shown in FIG. 5 with respect to the power transmission from the input shaft GW1 to the oil pump drive device 1. Instead of the sprocket KT in FIG. 5, a spur gear drive ST is provided in FIG. 6. An intermediate gear of the spur gear drive ST, which is rotatably supported on the transmission housing GG, intermeshes with a gearwheel connected to the input shaft GW1 and with the external gearing V, is the external gearing V being connected to the third element E3 of the planetary gear set RS of the oil pump drive device 1.

Figure 7:
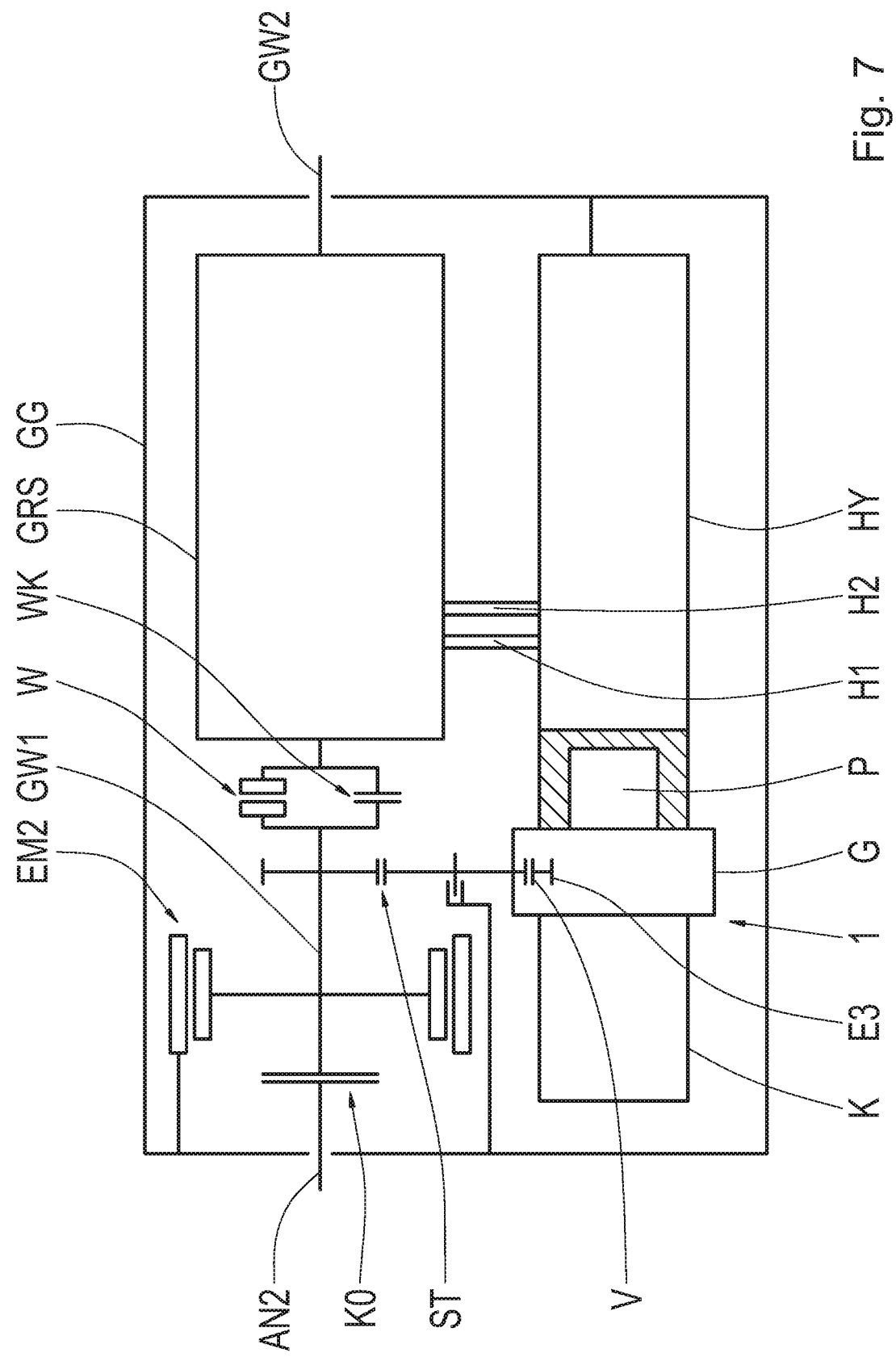
FIG. 7 shows an additional schematic view of a motor vehicle transmission having the oil pump drive device according to the invention.

FIG. 7 shows an additional schematic view of a transmission for a motor vehicle, which essentially corresponds to the transmission represented in FIG. 6, except that the transmission has a torque converter W in this case. A pump side of the torque converter W is connected to the input shaft GW1 and a turbine side of the torque converter W is connected to the input of the transmission gear set GRS.

The pump side and the turbine side of the torque converter W are connectable to one another by engaging a torque converter lockup clutch WK.

The variants of the transmission described with reference to FIGS. 5-7 are to be considered merely examples. It should be appreciated that each of the variants could be used with or without a separating clutch K0. Similarly, each of the variants could be used with or without the electric machine EM2. Further, the transmission gear set GRS can utilize multiple planetary gear sets and/or one or multiple countershaft systems in order to implement gear ratios. Additionally, the oil pump drive device 1 described is usable with different transmission types, for example, with an automatic transmission, an automated transmission, or a dual clutch transmission.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 oil pump drive device
AN oil pump drive shaft
RS planetary gear set
E1 first element
E2 second element
E3 third element
V external gearing
S stator
R rotor
RW rotor shaft
K plastic mass
G housing
F flange
A cutout
L1 first bearing
L2 second bearing
L2H bearing sleeve
L3 further bearing
P cover plate
B bolt
H sleeve
AC interface
AC2 further interface
RE speed sensor
RE2 transmitter
E electronic control unit
HY hydraulic control unit
P oil pump
GW1 input shaft
GW2 output shaft
GRS transmission gear set
H1, H2 hydraulic line
EM2 electric machine
KT sprocket
ST spur gear drive
AN connection shaft
K0 separating clutch
W torque converter
WK torque converter lockup clutch

The invention claimed is:
1. An oil pump drive device (1), comprising:
a housing (G);
an oil pump drive shaft (AN1);
an electric motor comprising a rotor (R) and a stator (S); and a planetary gear set (RS) comprising a first element (E1), a second element (E2), and a third element (E3), the planetary gear set being supported by the housing (G), wherein the first element (E1) is connected to the rotor (R) of the electric motor, wherein the second element (E2) is connected to the oil pump drive shaft (AN1), wherein the third element (E3) is drivable by a drive source, the drive source being located outside the oil pump drive device (1), wherein a first bearing (L1) is supported on the housing (G), the first bearing (L1) supporting at least one of the first element (E1), the second element (E2), or the third element (E3) of the planetary gear set (RS) in a radial direction, and wherein the stator (S) of the electric motor is at least partially surrounded by a plastic mass (K), the stator (S) being attached to the housing (G) via the plastic mass (K).

2. The oil pump drive device (1) of claim 1, wherein the stator (S) is partially surrounded by the plastic mass (K) such that at least one of a laminated core or a winding overhang of the stator (S) is partially exposed.

3. The oil pump drive device (1) of claim 1, wherein the stator (S) is completely surrounded by the plastic mass (K) except for terminals of the stator (S).

4. The oil pump drive device (1) of claim 1, wherein the rotor (R) and the stator (S) protrude from the housing (G).

5. The oil pump drive device (1) of claim 1, further comprising a second bearing (L2) supported on the plastic mass (K), wherein the rotor (R) is supported by the first bearing (L1) and the second bearing (L2).

6. The oil pump drive device (1) of claim 5, wherein the first bearing (L1) or the second bearing (L2) is a freewheel unit.

7. The oil pump drive device (1) of claim 1, further comprising a cover plate (CP), wherein the cover plate (CP) comprises an interface (AC) to a phase circuit of the stator (S).

8. The oil pump drive device (1) of claim 7, further comprising a speed sensor (RE) attached to the cover plate (CP), the speed sensor (RE) being configured to detect a rotational speed of the rotor (R).

9. The oil pump drive device (1) of claim 7, wherein the stator (S) is arranged between the housing (G) and the cover plate (CP).

10. The oil pump drive device (1) of claim 7, wherein a plurality of bolts (B) couples both the cover plate (CP) and the plastic mass (K) to the housing (G), wherein bolts of the plurality of bolts (B) are distributed along a circumference of the stator (S).

11. The oil pump drive device (1) of claim 7, further comprising an electronic control unit (E) attached to at least one of the housing (G) or the plastic mass (K), the electronic control unit (E) being configured to control the electric motor.

12. The oil pump drive device (1) of claim 11, wherein the control unit (E) comprises a further interface (AC-E), the further interface (AC-E) coupling with the interface (AC) arranged in the cover plate (CP).

13. The oil pump drive device (1) of claim 12, wherein the interface (AC) and the further interface (AC-E) form a plug connection.

14. The oil pump drive device (1) of claim 1, wherein the first element (E1) of the planetary gear set (RS) is a sun gear, the second element (E2) of the planetary gear set (RS) is a planet carrier, and the third element (E3) of the planetary gear set (RS) is a ring gear.

15. A transmission for a motor vehicle, comprising the oil pump drive device (1) of claim 1.

16. The transmission of claim 15, further comprising a hydraulic control unit (HY), wherein the oil pump drive device (1) is attached to the hydraulic control unit (HY).

17. The transmission of claim 16, further comprising an oil pump (P) arranged within the hydraulic control unit (HY), wherein the oil pump drive shaft (AN1) is connected to the oil pump (P).

* * * * *